United States Patent [19]

Coleman et al.

[11] Patent Number: 4,954,153
[45] Date of Patent: Sep. 4, 1990

[54] PROCESSING GLASS SHEETS WITH CERAMIC ENAMEL BANDS

[75] Inventors: Charles R. Coleman, Pittsburgh; Terry L. Wolfe, Allison Park; John A. Winter; Elizabeth A. Fiano, both of Pittsburgh, all of Pa.

[73] Assignee: PPG Industries, Inc., Pittsburgh, Pa.

[21] Appl. No.: 374,910

[22] Filed: Jul. 3, 1989

[51] Int. Cl.[5] .................... C03C 3/00; C03C 17/04; C03B 23/02
[52] U.S. Cl. .................... 65/60.53; 65/43; 65/60.7; 65/106
[58] Field of Search .................... 65/43, 60.53, 60.7, 65/60.2

[56] References Cited

U.S. PATENT DOCUMENTS

| | | | |
|---|---|---|---|
| 3,762,902 | 10/1973 | Wagner et al. | 65/60.2 |
| 3,833,975 | 9/1974 | Cahnman et al. | 28/72.1 |
| 3,864,546 | 2/1975 | Cahaman et al. | 219/354 |
| 3,966,447 | 6/1976 | Asahara et al. | 65/43 |
| 4,197,108 | 4/1980 | Frank et al. | 65/273 |
| 4,265,650 | 5/1981 | Reese et al. | 65/104 |
| 4,407,847 | 10/1983 | Boaz | 427/35 |
| 4,453,669 | 6/1984 | Karla et al. | 237/12.3 |
| 4,528,016 | 7/1985 | Canfield et al. | 65/163 |
| 4,531,047 | 7/1985 | Canfield et al. | 219/354 |
| 4,601,743 | 7/1986 | Canfield | 65/162 |
| 4,654,067 | 3/1987 | Ramus et al. | 65/60.2 |
| 4,684,388 | 8/1987 | Boaz | 65/24 |
| 4,684,389 | 8/1987 | Boaz | 65/24 |
| 4,685,200 | 8/1987 | Bokil | 65/43 |
| 4,767,434 | 8/1988 | Schwartz et al. | 65/294 |
| 4,820,902 | 4/1989 | Gillery | 219/203 |

OTHER PUBLICATIONS

High Density Radiant Heater (Model 5208) published by Research, Inc.

Primary Examiner—Robert L. Lindsay
Attorney, Agent, or Firm—Andrew C. Siminerio

[57] ABSTRACT

Thermal energy from quartz lamp heaters are used to fire ceramic enamel material onto a glass substrate while minimizing any increase in the temperature of the glass.

13 Claims, 1 Drawing Sheet

4,954,153

PROCESSING GLASS SHEETS WITH CERAMIC ENAMEL BANDS

OBJECT OF THE INVENTION

1. Field of Invention

This invention relates to heat activating a material on a substrate and in particular to using high intensity infrared heaters to heat a ceramic band on a glass sheet.

2a. Background of the Invention

Ceramic enamels are commonly used on automotive and architectural glass for ornamentation. The enamel is applied to the glass substrate in a predetermined pattern in any convenient manner known in the art, for example, screen printing, and "fired" onto the glass, i.e. heated to melt the enamel frit and fuse it to the glass surface. The temperature and the length of time at the temperature required to fire the enamel depends on, among other things, the type and amount of frit and the thickness of the enamel. Thicker enamel layers, enamels with more frit, and/or enamels with higher melting temperature frits require higher firing temperature and/or longer exposure at the firing temperature to bond the enamel to the glass substrate. Firing the enamel typically requires that the enamel be heated in excess of 1100° F. (593° C.). Prolonged exposure of glass to these temperatures may result in optical distortion. In addition, if the glass is simultaneously being heated for further processing, such as shaping by a press bending operation, softened ceramic enamel may stick to the press face of a shaping mold. As a result, the press faces are coated with special materials such as boron nitride to reduce sticking.

It would be advantageous to be able to process a glass sheet with a decorative ceramic enamel coating without effecting the optical properties of the glass.

2b. Patent of Interest

U.S. Pat. No. 3,833,975 to Cahnman et al. teaches a method of bulking and heat setting synthetic resin yarn by exposing the yarn to a special fused-quartz radiant heater whose surface is parallel to the movement of the yarn past the heater.

U.S. Pat. No. 3,864,546 to Cahnman et al. teaches a system for irradiating a discontinuously moving fabric web. A plurality of fused quartz heater panels are used to rapidly heat the moving web. Each heater is pivotally mounted relative to the web such that if the web stops, the heaters can pivot away from the web to prevent the web from overheating.

U.S. Pat. Nos. 4,407,847, 4,684,388, and 4,684,389 to Boaz teach the use of radiation curable paints on a glass substrate. After applying the paint to the substrate, it is exposed to ultraviolet radiation which cures the paint and temporarily bonds it to the glass. The glass is then heated to the fusion temperature of the paint to fuse the paint onto the glass surface.

U.S. Pat. No. 4,528,016 to Canfield et al. and 4,601,743 to Canfield teach a reciprocating glass sheet heating furnace that utilizes a matrix array of infrared heaters to heat the glass in the furnace. Each heater in the matrix is individually controlled so that the heating profile with the furnace can be precisely adjusted.

U.S. Pat. No. 4,531,047 to Canfield et al. teaches a clip-mounted quartz tube electric heater having a helical heating coil disposed within the quartz tube.

SUMMARY OF THE INVENTION

This invention provides a method of preferentially heating a glass sheet having decorative ceramic enamel borders to fire the enamel on to the glass without adversely affecting the optical quality of the glass. The preferential heating is achieved by using heaters that radiate thermal energy at selected wavelengths that are more readily absorbed by the enamel than the glass so that the enamel heats more quickly than the glass. In one particular embodiment of the invention, glass with a ceramic enamel border is preheated to a temperature above its strain point temperature. The coated glass is then exposed to a quartz heater to preferentially heat the enamel to a sufficiently high temperature to fire it onto the glass. The ceramic enamel is then allowed to cool down to the temperature of the remainder of the glass.

DETAILED DESCRIPTION OF THE INVENTION

This invention teaches preferential heating of a ceramic enamel border on a glass substrate but it is understood that the invention can be used in other applications where selected heating is required to process heat activated materials and in particular heat curable and/or fusible material such as but not limited to resins and adhesives.

Figure 1:
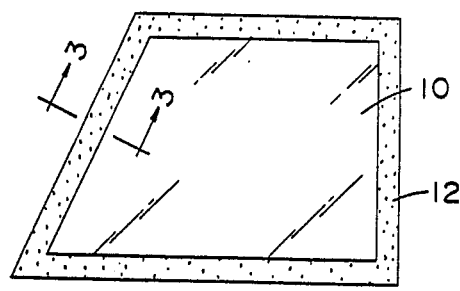
FIG. 1 is an elevational view of a glass sheet with a ceramic enamel border.

Referring to FIG. 1, glass sheet 10 has a ceramic enamel pattern which, although not limiting in the present invention, is a ceramic enamel border 12 applied to the marginal area of the glass sheet 10. The border 12 can be applied in any convenient manner known in the art, for example, screen printing and may be dried for easier handling of the glass sheet 10 prior to firing the enamel. The ceramic enamel typically includes colorant and glass frit in a carrying medium such as oil. During firing, the glass 10 and enamel border 16 are heated to burn off the carrier medium and soften and melt the frit. As discussed earlier, the firing parameters of the enamel depends in part on the relative amounts and types of frit materials. In automotive applications, enamels such as those available from Drakenfeld Colors, Pennsylvania and O. Hommel Co., Pennsylvania typically fire in within a temperature range of about 1100° F. to 1200° F. (593° C. to 649° C.).

Figure 2:
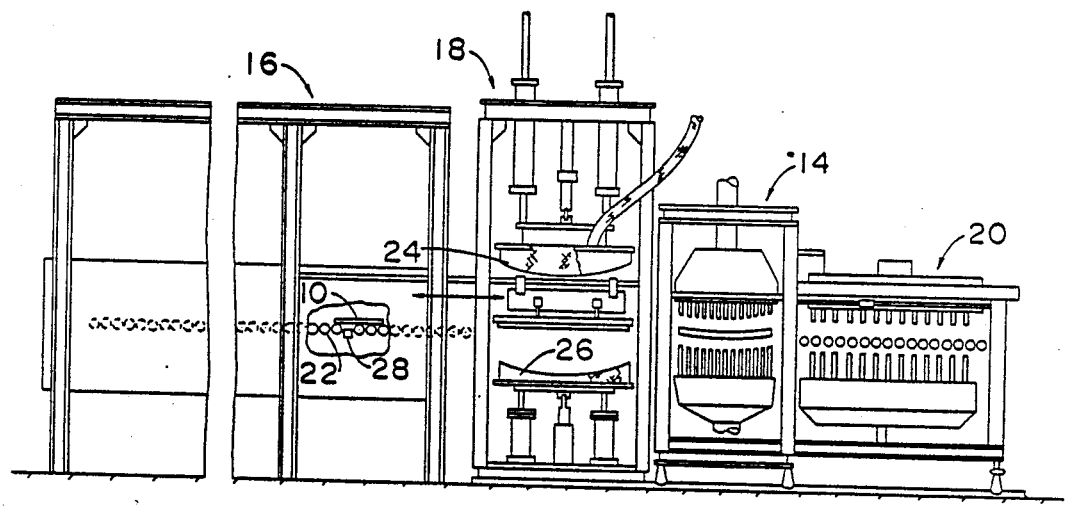
FIG. 2 is a schematic of a typical glass sheet heating, shaping, and cooling arrangement.

Although not limiting in the present invention, FIG. 2 illustrates one type of glass sheet heating, bending, and cooling arrangement 14, which includes a roller hearth furnace 16, shaping station 18, and cooling station 20. The coated glass sheet 10 is conveyed through the roller hearth 16 over a series of transversely extending, longitudinal spaced conveyor rolls 22. In the heating and shaping arrangement shown in FIG. 2, the glass 10 and border 12 are heated, typically by nichrome wire coil heaters (not shown) as is well known to those skilled in the art, to its heat softening temperature prior to shaping, which for typical soda-lime-silica glass is between approximately 1050° F. to 1200° F. (566° C. to 649° C.) depending on the complexity of the final glass shape and the speed at which shaping occurs. Nichrome wire heaters typically radiate thermal energy at a principal wavelength of about 4 microns or greater. At these wavelengths, 100% of the thermal energy is absorbed at the glass surface to heat both the glass 10 and border 12. During heating, the border 12 is fired onto the surface of the glass 10. After heating, the glass 10 is transferred to the shaping station 18 and shaped in any convenient manner known in the art, for example, by pressing the heat softened glass sheet 10 between a pair of opposing press faces 24 and 26 as disclosed in U.S. Pat. No. 4,767,434 to Schwartz et al. and U.S. Pat. No. 4,197,108 to Frank et al. both of which teachings are incorporated by reference. After shaping, the shaped glass 10 is transferred to a cooling station 20 where it is controllably cooled to strengthen the glass.

As an alternative, the glass 10 may be shaped by supporting the glass 10 on an outline bending mold (not shown) and conveying it through a heating lehr to heat the glass 10 and allow it to sag by gravity to a desired configuration as is well known in the art and disclosed in U.S. Pat. No. 4,265,650 to Reese et al., which teachings are hereby incorporated by reference.

With continued reference to FIG. 2, if the enamel 12 is still soft immediately prior to shaping the glass 10 it may stick to the upper press face 24. To avoid this condition, press face 24 may be treated with a material that reduces sticking, such as an example, a boron nitride spray. As an alternative, enamels with firing temperatures higher than the heat softening temperature of the glass 10 may be used. With such an arrangement, the glass and enamel are heated to the enamel firing temperature, cooled to allow the enamel to harden, and then shaped. However, it has been found that prolonged exposure to these higher temperatures may result in optical distortion of the glass and in particular, in the roller hearth 16 arrangement as shown in FIG. 2, a defect, commonly referred to as roll ripple, may occur.

Figure 3:
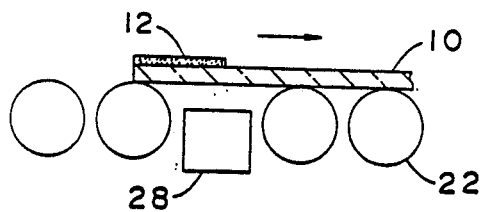
FIG. 3 is a partial cross-sectional view through the glass sheet as it is conveyed through the arrangement illustrated in FIG. 2 and is exposed to a quartz lamp heater.

To avoid this condition, the present invention teaches the heating of the ceramic border 12 to its firing temperature while maintaining the glass 10 at a lower temperature to minimize any optical distortion in the glass 10 due to heating. Although not limiting in the present invention, the firing of the enamel while minimizing associated increase in glass temperature is accomplished by preferentially heating selected portions of the glass 10, and in particular by using high density, infrared heaters 28 positioned within the furnace 16, either between rolls 22 as shown in FIGS. 2 and 3, or supported above the glass 10 and rolls 22 (not shown). In a preferred embodiment of the invention the heaters 28 are high density quartz lamp heaters such as those available from Research Incorporated, Minnesota. Unlike typical nichrome wires coil heaters whose thermal energy is absorbed fairly equally by the glass 10 and border 12 to uniformly heat both materials, the heaters 28 in the present invention radiate thermal energy at a wavelength less than 4 microns which is "partially transparent" to the glass 10, i.e. a majority of the thermal energy will pass through the glass 10 and will not be absorbed by the glass 10, and is preferentially absorbed by the darker ceramic enamel of border 12 to heat it. In this fashion, the ceramic enamel can be rapidly heated to a substantially higher firing temperature while the glass sheet 10 remains at a lower temperature so as to avoid distortion associated with higher temperatures. Although not limiting in the present invention, in a preferred embodiment, the thermal energy of the heaters 28 is at a wavelength of about 1 micron. In addition, the glass 10 is preferably heated to about its strain point temperature, which for typical soda-lime-silica glass is approximately 925° F. to 970° F. (496° C. to 521° C.), to prevent thermal fracture of the glass 10 due to the temperature differential between the glass 10 and the enamel 12. After firing, the enamel 12 is allowed to cool to the temperature of the remaining portions of the glass sheet 10 by reducing power to the heaters 28 or moving the glass 10 away from the heaters 28. The glass sheet 10 is then cooled or shaped is any convenient manner well known in the art and cooled. In this manner, the glass 10 can be maintained at lower temperature than is required to fire the enamel thus providing better optics in the glass 10 by reducing distortion.

Testing was performed using heaters which emitted energy at wavelengths near 1 micron. The heaters used in these experiments were Model 5208 High Density Radiant Heaters from Research Incorporated, Minnesota. The case body and aluminum reflector of the heaters were water cooled. Each quartz lamp chamber was enclosed behind a window of clear fused quartz.

Spectroscopic analysis showed that at wavelengths near 1 micron, dark unfired ceramic enamel absorbed almost 74% of the heater energy, while 0.090 inch (2.3 mm) thick iron containing glass such as that sold by PPG Industries, Inc, under the trademark Solex ®, absorbed about 42% of the energy and clear glass absorbed only 23%. Therefore, the dark, unfired ceramic enamel absorbed the energy of the heaters 28 more readily than the glass on which it was printed, thus heating the enamel to a higher temperature than the glass substrate.

The effectiveness of the quartz lamp heaters 28 in firing the enamel were based on the surface smoothness of the fired enamel. There are various indicators of surface smoothness. One particular indicator is the measure of the surface reflectance, or gloss, using a glossmeter which measures specular reflectance of a surface and compares it to a standard base-line reflection level. One type of glossmeter that may be used to measure surface smoothness, in terms of gloss units, is a Glossgard ® glossmeter available from Gardner Laboratory Division of Pacific Scientific, Maryland, which measures gloss based on ASTM D 523 testing procedures and standards. During testing it was found that a measured gloss reading of about 10 gloss units or greater on the enamel, using a 60° Glossgard ® glossmeter, calibrated to a black standard, indicated acceptable enamel firing.

During initial trials, samples of 0.090 inch (2.3 mm) thick Solex ® glass with a band of gray windshield enamel available from O. Hommel under the designation 42-841, were heated to near 1060° F. (571° C.). The samples were then exposed to a heater 28, which delivered 100 watts per line an inch of radiant power, for 5 seconds. During this time span, the glass temperature on average rose nearly 20° F. (11° C.), while the rise in the temperature of the enamel band was approximately 65° F. (36° C.). The ceramic enamel, which was heated to a substantially higher temperature than the glass substrate, has a gloss of 11 units. Also, it was noted that there is a generally linear relationship between the gloss of the enamel and the time the sample is exposed to the heater 28.

In order to test the effect of furnace temperature on the ability of the quartz lamp heater to fire enamel, the samples were conveyed through a furnace at varying heat patterns. The furnace heating cycles were such that the combined conventional firing time before the heater 28, plus the added firing power delivered by the heater 28 at the end of the cycle, produced a gloss of 10 units. The samples were exposed to the heaters for approximately 1 second. Thermocouples placed on the enamel band and near the center of the glass showed that as the samples passed over the heater 28, the ceramic enamel temperature increased to a temperature in the range of between 16° F. to 30° F. (9° C. to 17° C.) higher than the elevated glass sheet temperature. Additional testing using clear glass presented a difference in temperature increase between the enamel and glass of almost 50° F. (28° C.). Subsequent testing of the samples showed that the use of heater 28 to fire the enamel significantly reduced the roll ripple distortion.

Further testing was conducted at faster furnace conveying speeds, i.e. less heater exposure time. The results showed that even at exposure times of less than one-half second, the overall time required for firing the enamel using conventional coil heaters and quartz lamp heaters was consistently reduced when compared to conventional firing without quartz lamp heaters.

Additional testing was performed to determine the capability of the heaters 28 to fire a higher temperature enamel, i.e. enamel that has a firing temperature higher than the heat softening temperature of the glass substrate. Glass samples of 0.24 inch (6.2 mm) thick Solex ® glass with a band of gray enamel available from Ferro under the designation A-3545 and A-3466, were consistently fired at temperatures between approximately 1165° F. to 1190° F. (629° C. to 643° C.) in less time using the heaters 28 when compared to convention firing while minimizing any increase in the glass temperature.

When using the quartz lamp heaters 28 to accelerate the firing of the ceramic enamel, care must be taken to avoid distortion and breakage of the glass due to the temperature differential between the enamel and the cooler, underlying glass. It has been determined that for glass samples passed over the heaters 28 at temperatures ranging from 450° F. to 1000° F. (232° C. to 538° C.) and at a conveying speed of 2.6″/sec. (6.6 cm/sec.), the warmer the glass is before it reaches the heaters 28, the shorter the overall time necessary to produce a gloss of at least 10 units in the enamel. Also, it was found that samples fired earlier in the cycle exhibited a greater degree of roll ripple distortion than did those fired towards the end of the firing cycle. In a preferred embodiment of the invention, the glass is heated to at least its strain point temperature so as to minimize any stresses in the glass due to the temperature differential between the glass and ceramic enamel. However, based on these teachings of this disclosure, it would be obvious to one skilled in the art that the heaters 28 can be utilized at lower glass temperatures for shorter periods of time to avoid inducing excessive stress in the glass 10.

From the testing, it is apparent that the use of quartz lamp heaters to preferentially heat the enamel provides several advantages. First, the length of the heating furnace can be reduced since the temperature of the enamel can be increased over a short distance and in less time to fire the enamel by incorporating quartz lamp heaters into the conventional heating operation. Without the quartz lamp heaters, the glass and enamel temperatures would have to be elevated within the furnace using conventional radiant heaters.

The quartz lamp heaters also may be utilized to reduce sticking during bending. By using a higher firing temperature enamel, the enamel can be fired onto the glass and then cooled prior to bending so that the enamel hardens and does not stick to the press face of a shaping mold.

In addition, the quartz lamp heaters provide good control of the heating operation. Because of their quick response time, for example obtaining approximately 90% of full power in 2 to 3 seconds, they can be cycled as required rather than having to operate continuously at full power and can be used to spot heat selected portions of the coated glass.

Testing was conducted to evaluate the effectiveness of the quartz lamp heaters in preferentially heating and firing an additional material on an already fired ceramic enamel band, and in particular, in firing a silver containing ceramic enamel. In a first series of tests, the silver containing enamel was screen printed over a fired ceramic band and was subsequently fired in a roller hearth furnace. It was observed that the quartz lamp heaters did not significantly affect the firing cycle of the silver containing enamel. It is believed that this is due in part to the relatively low amount of frit in the silver containing enamel as compared to the other decorative ceramic enamels that were tested. However as the amount of frit increases, the beneficial impact of the quartz lamp heaters on reducing the firing cycle of the additional material in the roller hearth furnace should become more apparent.

In a second series of tests, the surface of a glass sheet with a fired ceramic enamel band and screen printed silver ceramic band was covered with a second glass sheet. The pair of glass sheets, or doublets, were then positioned on a bending iron (not shown) and conveyed through a heating lehr to shape the glass sheets in a manner similar to that disclosed in U.S. Pat. No. 4,265,650. Because of the bending iron, the quartz lamp heaters were positioned above the glass sheets. The results of this processing technique were inconsistent, with the silver ceramic enamel firing in some trials and not fully firing in others. However, it was been observed that better drying of the silver ceramic enamel prior to overlaying the glass sheets and subsequent firing increased the ability of the heaters to fire the silver ceramic enamel during heating for bending.

Figure 4:
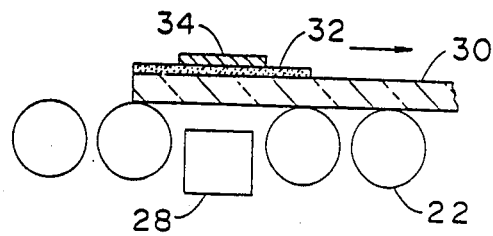
FIG. 4 is a cross-sectional view similar to FIG. 3 showing a glass substrate, ceramic border, and electroconductive bus bar.

The present invention may also be used to assist the firing of multiple enamel layers on a glass sheet in a single heating operation and in particular for electrically heatable backlights and windshields as disclosed in U.S. Pat. No. 4,453,669 to Karla et al. and U.S. patent application Ser. No. 138,007 to Gillery, filed on Dec. 28, 1987, which teachings are incorporated by reference. Referring to FIG. 4, glass sheet 30 includes both a ceramic enamel border 32 and an electroconductive bus bar 34 which preferably is a silver containing ceramic enamel. The ceramic enamel border 32 was screen printed on glass sheet 30 and dried, the silver ceramic enamel 34 was screen printed over the ceramic enamel 32 and dried, and the two enamels were fired simultaneously by conveying glass sheet 30 through a roller hearth furnace. It was found that during firing of the border 32 and bus bar 34, the bus bar 34 reflected heat so as to reduce the effective firing of the underlying ceramic border 32. As a result, the quartz lamp heaters were positioned below the glass sheet 30 such that the energy from the heaters 28 passed through the glass and was absorbed by the underlying border 32 to assist the firing of the ceramic enamel.

Preliminary testing resulted with the samples being either overfired, i.e. the ceramic enamels began to mix with the silver enamel 34 affecting the color of the ceramic enamel 32, or underfired, i.e. the frit in the underlying ceramic enamel 32 was not fully melted. The overfired condition was indicated by a dark area in the enamel 32 underneath the silver enamel 34 when viewed through the glass sheet 30 and the underfired was indicated by a lighter area under the silver enamel 34. In some cases the samples exhibited signs of both overfiring and underfiring on the same piece. This would indicate that the range of the processing parameters necessary to fire both enamels using this technique is very narrow. The best results were attained when the samples passed over the quartz lamp heaters at a temperature at about 1030° F. (571° C.) and at speed of 2 inch/sec. (5.08 cm/sec.). However, there were still small areas of slight overfiring and underfiring, and the results were not repeatable from one trial to the next.

The present teaches the use of high intensity, short wave infrared heaters to preferentially heat selected portions of a coated glass sheet, in particular to fire a ceramic band, while minimizing the temperature increase of the glass sheet. The energy from the heaters rapidly raises the temperature of the ceramic band to a temperature higher than the underlying glass sheet. By maintaining the glass sheet at a temperature lower than that required to fire the ceramic enamel, there is less of a chance to adversely affect the optical properties of the glass. In addition, the total time required to heat the glass and ceramic border for firing and/or bending is reduced. The quartz lamp heaters may also be used to fire additional materials onto previously fired ceramic coated areas and further be used to simultaneously fire multiple enamel layers.

The forms of the invention shown and described in this disclosure represent illustrative preferred embodiments thereof. It is understood that the invention is defined in the claimed subject matter which follows and that various modifications thereof which become obvious in light of reading the description are incorporated therein.

We claim:

1. A method of processing a glass substrate having a ceramic enamel material supported on the glass substrate, the glass substrate having a predetermined softening temperature, comprising:

applying a ceramic enamel material having a predetermined firing temperature to selected portions of a glass substrate, wherein said firing temperature is greater than said softening temperature of said substrate;

preheating said glass substrate and material to a temperature at or below said softening temperature;

exposing said selected portions of said glass substrate and said material to thermal radiation of predetermined wavelengths, wherein said material is preferentially absorbed by and more responsive to said thermal radiation than said substrate, for a period of time sufficient to increase the temperature of said material to said firing temperature while maintaining the temperature of said selected portions of said glass substrate at or below said softening temperature;

controllably cooling said material to about the same temperature as said preheated glass substrate; and shaping said glass substrate.

2. The method as in claim 1 wherein said exposing step includes exposing said glass substrate and ceramic enamel material to thermal radiation having a wavelength of less than about 4 microns to bond said ceramic enamel material to said glass substrate.

3. The method as in claim 2 wherein said exposing step includes exposing said glass substrate and ceramic enamel material to selected thermal radiation having a wavelength of about 1 micron to bond said ceramic enamel material to said glass.

4. The method as in claim 2 wherein said preheating step includes preheating said glass substrate to at least about its strain point temperature.

5. The method as in claim 2 wherein said preheating step includes the step of heating said glass substrates to its softening temperature.

6. The method as in claim 5 wherein said glass substrate is a first glass sheet and prior to said exposing step further including the step of overlaying said first glass sheet with a second glass sheet such that said enamel material is positioned between inwardly facing major surfaces of said first and second sheets.

7. The method as in claim 2 wherein said ceramic enamel material is a first material and prior to said exposing step further including the steps of drying said first material and applying a second ceramic enamel material over selected portions of said first material, such that said exposing step increases the temperature of said first and second materials so as to bond portions of said first and second materials to said glass substrate and first material, respectively.

8. The method as in claim 7 further including the step of positioning said glass substrate such that said thermal radiation passes through said glass substrate prior to being absorbed by said first ceramic material.

9. The method as in claim 7 wherein said glass substrate is a first glass sheet and prior to said exposing step further including the step of overlaying said first glass sheet with a second glass sheet such that said enamel materials are positioned between inwardly facing major surfaces of said first and second sheets.

10. The method as in claim 9 wherein said shaping step includes the step of supporting said glass sheets on an outline bending mold and heating said glass to allow said glass sheets to sag by gravity to a desired configuration.

11. The method as in claim 10 wherein said second material is an electroconductive material.

12. The method as in claim 2 wherein prior to said applying, exposing and shaping steps further including the step of bonding a base material to said selected portion of said glass substrate and said applying step includes applying said ceramic enamel material to said base material wherein said exposing step bonds said enamel material to said base material.

13. The method as in claim 12 wherein said substrate is a first glass sheet and prior to said exposing step further including the step of overlaying said first glass sheet with a second glass sheet such that said enamel materials are positioned between inwardly facing major surfaces of said first and second sheets.

* * * * *